(12) United States Patent
Ko et al.

(10) Patent No.: US 12,374,063 B2
(45) Date of Patent: Jul. 29, 2025

(54) METHOD AND DEVICE FOR FILTERING VIRTUAL OBJECT USING PLURALITY OF SENSORS

(71) Applicant: AVIKUS CO., LTD., Seoul (KR)

(72) Inventors: Kwang Sung Ko, Seoul (KR); In Beom Kim, Seoul (KR); Su Rim Kim, Seoul (KR); Jin Mo Park, Seoul (KR); Hui Yong Choi, Seoul (KR); Hu Jae Choi, Seoul (KR)

(73) Assignee: AVIKUS CO., LTD., Seoul (KR)

( * ) Notice: Subject to any disclaimer, the term of this patent is extended or adjusted under 35 U.S.C. 154(b) by 0 days.

(21) Appl. No.: 18/928,004

(22) Filed: Oct. 26, 2024

(65) Prior Publication Data

US 2025/0054251 A1    Feb. 13, 2025

Related U.S. Application Data

(63) Continuation of application No. PCT/KR2023/022039, filed on Dec. 29, 2023.

(30) Foreign Application Priority Data

Dec. 30, 2022  (KR) ..................... 10-2022-0190734

(51) Int. Cl.
*G06T 19/00* (2011.01)
*G06V 10/25* (2022.01)
*H04N 23/695* (2023.01)

(52) U.S. Cl.
CPC ............ *G06T 19/006* (2013.01); *G06V 10/25* (2022.01); *H04N 23/695* (2023.01); *G06V 2201/07* (2022.01)

(58) Field of Classification Search
None
See application file for complete search history.

(56) References Cited

U.S. PATENT DOCUMENTS

2015/0350552 A1   12/2015   Pryszo

FOREIGN PATENT DOCUMENTS

| JP | 2000152220 A | 5/2000 |
|---|---|---|
| KR | 101693982 B1 | 1/2017 |
| KR | 10-2020-0050808 A | 5/2020 |
| KR | 10-2112000 B1 | 5/2020 |
| KR | 1020200095888 A | 8/2020 |
| KR | 10-2191504 B1 | 12/2020 |
| KR | 10-2260441 B1 | 6/2021 |
| KR | 10-2021-0147848 A | 12/2021 |
| KR | 10-2479959 B1 | 12/2022 |

OTHER PUBLICATIONS

International Search Report.

*Primary Examiner* — Nicholas R Wilson
(74) *Attorney, Agent, or Firm* — Harvest IP Law, LLP

(57) ABSTRACT

A device according to an aspect includes a memory in which at least one program is stored and at least one processor configured to execute the at least one program, wherein the at least one processor obtains information about a candidate object using a distance detection sensor, obtains an image of the candidate object using an image capturing sensor, determines whether the candidate object is a real object using the image of the candidate object, and displays a marker containing information about the candidate object determined to be a real object on a monitoring image.

15 Claims, 18 Drawing Sheets

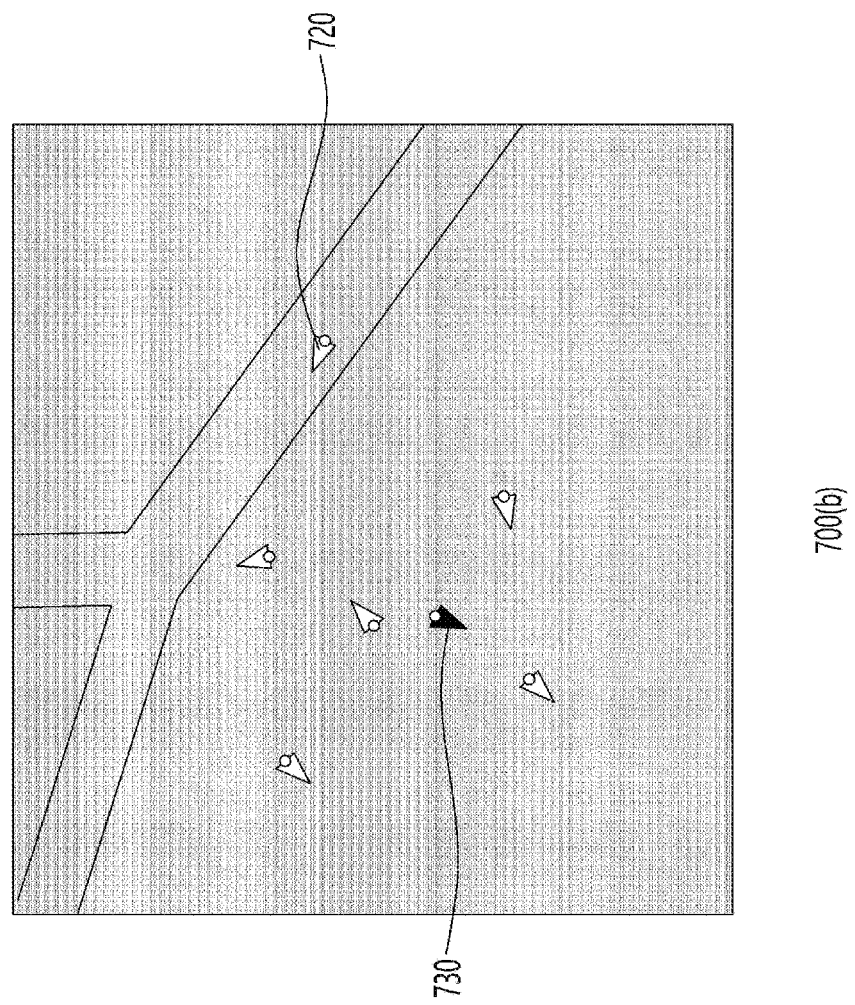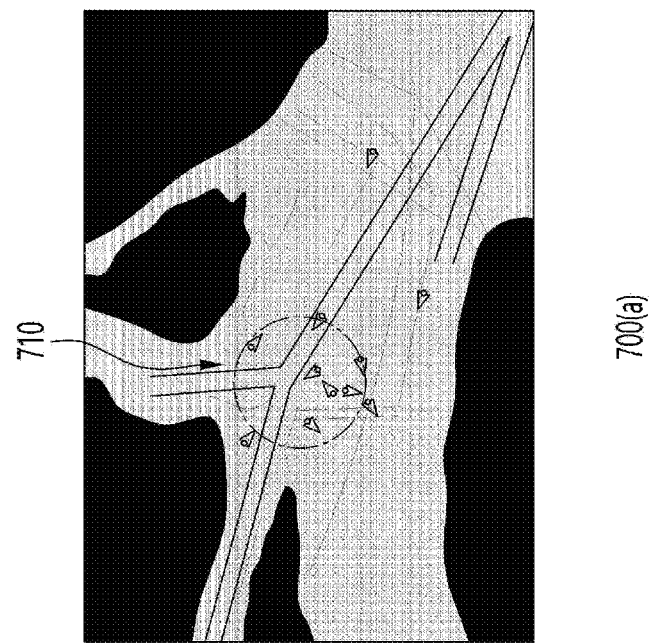
FIG. 7A
FIG. 7B

METHOD AND DEVICE FOR FILTERING VIRTUAL OBJECT USING PLURALITY OF SENSORS

CROSS REFERENCE TO RELATED APPLICATIONS

This application is a continuation application of International Application No. PCT/KR2023/022039 filed on Dec. 29, 2023, which claims priority from Korea Patent Application No. 10-2022-0190734 filed on Dec. 30, 2022, the entire contents of which are incorporated herein for all purpose by this reference.

TECHNICAL FIELD

The present disclosure relates to a method and device for filtering a virtual object using a plurality of sensors.

BACKGROUND ART

In general, ships are provided with a navigation assistance system for stable navigation, and such a ship navigation assistance system may include various identification devices to detect surrounding objects during navigation.

Conventional ship navigation assistance systems use at least one sensor among sensors, such as a Radar device, an automatic identification system (AIS), an electronic navigational chart (ENC), and a global positioning system (GPS) device, to identify surrounding objects necessary for navigation.

Such conventional navigation assistance systems perform collision avoidance by sending commands directly to a steering (or a steering gear) or a propulsion device to perform steering or speed control in response to objects at risk of simple collision.

A conventional ship navigation assistance system disclosed in prior arts may identify objects by matching camera images with information obtained by an AIS and a Radar device, and thus guide the ship along a collision avoidance path.

However, the problem is that such a conventional ship navigation assistance system has limited ability to identify objects around the ship in operation.

In particular, the conventional ship navigation assistance system also has the problem of not being able to distinguish between real and virtual objects in the images it captures, and thus has the problem of not being able to identify objects accurately.

DISCLOSURE

Technical Problem

An objective is to provide a method and device for filtering a virtual object using a plurality of sensors. Another objective is to provide a computer-readable recording medium having recorded thereon a program to cause the method to be executed on a computer. The objectives to be solved are not limited to those described above, and other objectives are possible.

Technical Solution

According to one aspect of the present disclosure, a method of filtering a virtual object using a plurality of sensors includes: obtaining information about a candidate object using a first sensor; obtaining an image of the candidate object using a second sensor; determining whether the candidate object is a real object using the image of the candidate object; and displaying a marker containing information about the candidate object determined to be a real object on a monitoring image.

A device according to another aspect of the present disclosure includes: a memory in which at least one program is stored; and at least one processor configured to execute the at least one program, wherein the at least one processor obtains information about a candidate object using a distance detection sensor, obtains an image of the candidate object using an image capturing sensor, determines whether the candidate object is a real object using the image of the candidate object, and displays a marker containing information about the candidate object determined to be a real object on a monitoring image.

According to another aspect of the present disclosure, a computer-readable recording medium includes a recording medium having recorded thereon a program to cause the above-described method to be executed on a computer.

Advantageous Effects

According to embodiments of the present disclosure, by secondarily applying a filtering method to an initially recognized object, a misrecognized object may be deleted by the filtering method, and thus information about a detected object (e.g., classification information about ships such as merchant ships or fishing ships) may be provided based on object recognition having high reliability and accuracy, thereby providing optimal avoidance path information and speed information.

In addition, in the filtering method, in a case where filtering is performed by means of a PTZ camera, an effect of realizing active autonomous navigation may be provided by improving the reliability and accuracy of the identified object and providing information for collision avoidance appropriate to the dynamic characteristics of the detected object.

In addition, it is possible to more accurately and quickly determine whether an object is a real object or a virtual object by determining whether the object is included in an image obtained using the PTZ camera.

In addition, the information for collision avoidance described above may be transmitted to a conventional ship control device, such as a steering gear or a propulsion device, thereby providing an effect by which improved navigation assistance function services may also be used in the conventional ship control device.

The objectives of the present disclosure are not limited to the objects mentioned above, and other objectives not mentioned will be clearly understood by a person having ordinary skill in the art to which the present disclosure pertains from the following description.

DESCRIPTION OF DRAWINGS

FIGS. 7A and 7B are diagrams illustrating another example of displaying a marker on a monitoring image according to an embodiment.

BEST MODE

According to an aspect, a device for filtering a virtual image using a plurality of sensors includes: a memory in which at least one program is stored; and at least one processor configured to execute the at least one program, wherein the at least one processor obtains information about a candidate object using a distance detection sensor, obtains an image of the candidate object using an image capturing sensor, determines whether the candidate object is a real object using the image of the candidate object, and displays a marker containing information about the candidate object determined to be a real object on a monitoring image.

Mode for Invention

Terms used in describing embodiments are selected from common terms currently in widespread use as much as possible, but the meanings thereof may change according to the intention of a person having ordinary skill in the art to which the present disclosure pertains, judicial precedents, and the emergence of new technologies. In addition, in certain cases, terms may be arbitrarily selected by the applicant, and in such cases, the meanings thereof will be described in detail in the corresponding portions of the description. Therefore, the terms used in the specification should be defined based on the meanings of the terms and the descriptions provided in the specification, rather than based on the simple names of the terms.

It will be understood that a term "comprise" or "include" used in the specification is intended to cover non-exclusive inclusions unless explicitly described to the contrary. In addition, it will be understood a term such as "~ unit" or "~ module" used in the specification refers to a unit of processing at least one function or operation, and the unit or module may be implemented as software, hardware, or a combination of software and hardware.

It will also be understood that although terms "first", "second", etc., may be used in the specification to describe various components, these components should not be limited by these terms. These terms may only be used to distinguish one component from another component.

Hereinafter, the present disclosure will be described in detail with reference to the accompanying drawings. However, the present disclosure may be realized in various forms and are not limited to examples described herein.

Figure 1:
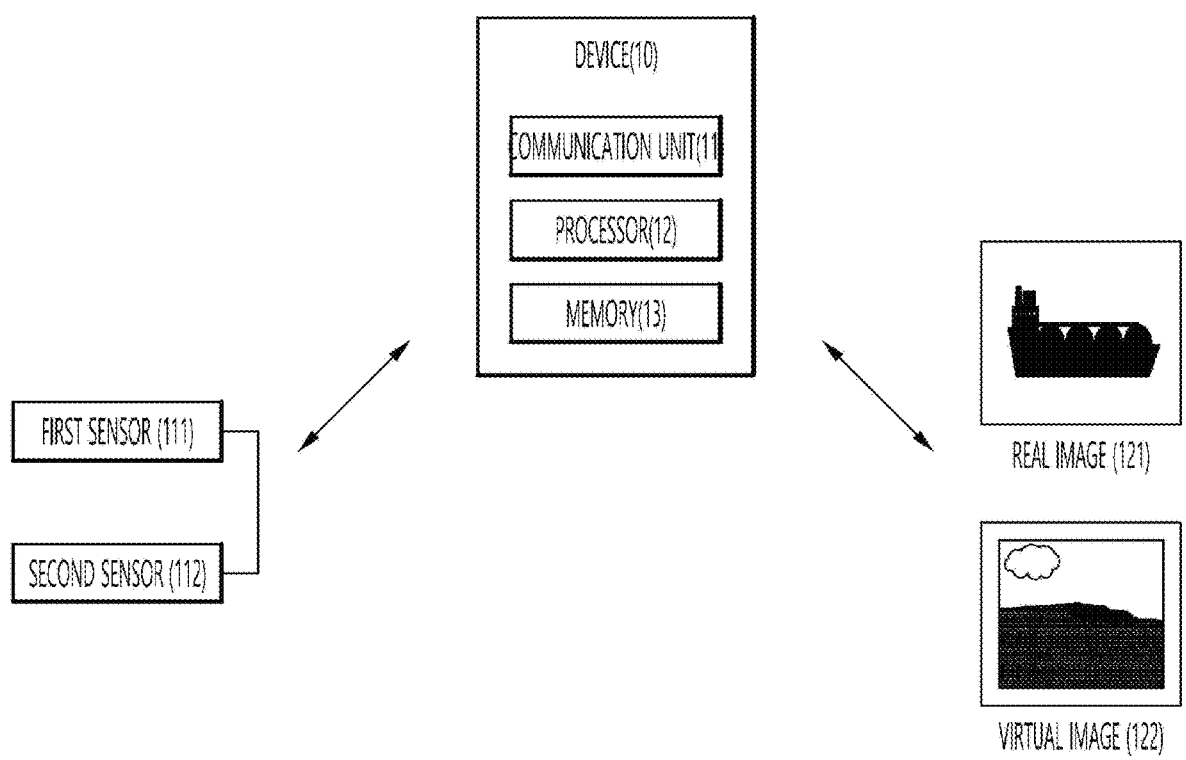
FIG. 1 is a diagram illustrating an example of a method of filtering a virtual object using a plurality of sensors according to an embodiment.
Figure 2:
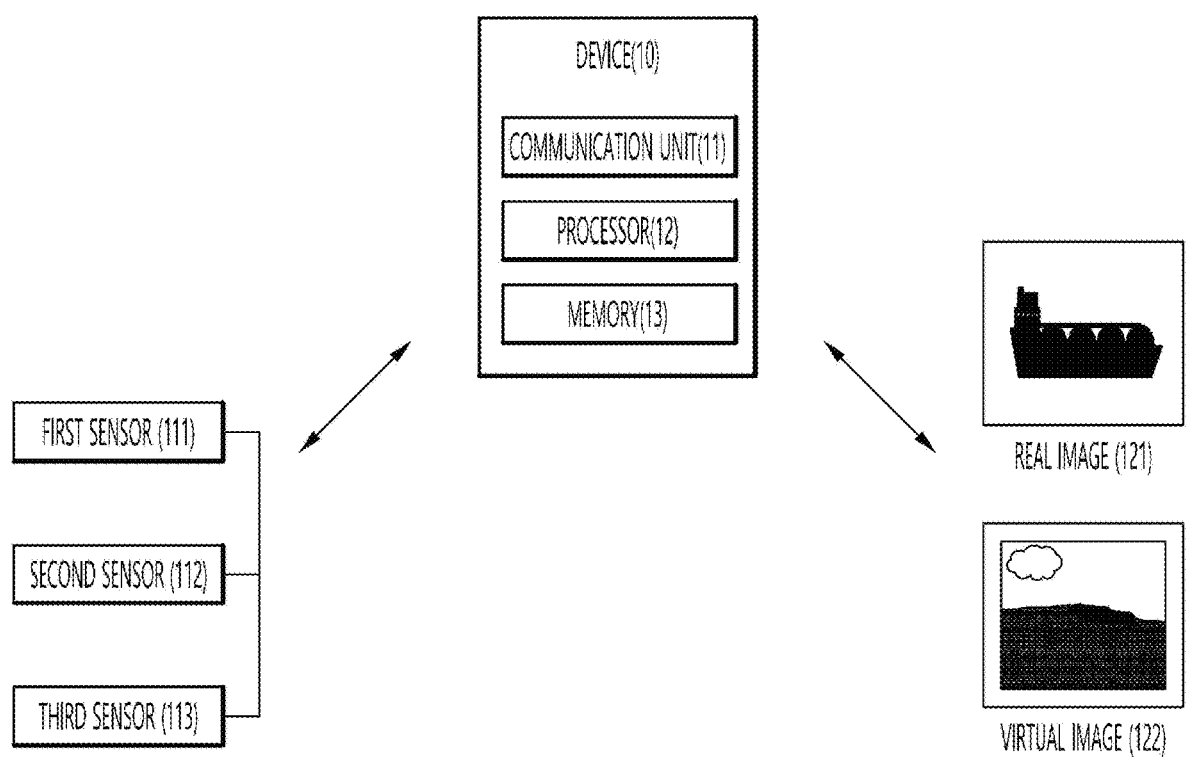
FIG. 2 is a diagram illustrating another example of the method of filtering a virtual object using a plurality of sensors according to an embodiment.

FIG. 1 is a diagram illustrating an example of a method of filtering a virtual object using a plurality of sensors according to an embodiment, and FIG. 2 is a diagram illustrating another example of the method of filtering a virtual object using a plurality of sensors according to an embodiment.

Hereinafter, examples of the method of filtering a virtual object using a plurality of sensors will be briefly described with reference to FIGS. 1 and 2. However, overlapping features of FIGS. 1 and 2 will be omitted.

First, referring to FIG. 1, a device 10 for filtering a virtual object using a plurality of sensors (hereinafter referred to as the "device") may include a communication unit 11, a processor 12, and a memory 13. In the device 10 of FIG. 1, only components related to the embodiment are shown. Therefore, it is obvious to a person having ordinary skill in the art that other general-purpose components may be included in addition to the components shown in FIG. 1.

The communication unit 11 may include one or more components enabling wired/wireless communication with an external server or an external device. For example, the communication unit 11 may include a short-range communication unit (not shown) and a mobile communication unit (not shown) for communication with an external server or an external device.

The memory 13 is hardware in which various data processed in the device 10 is stored, and may store programs for processing and controlling of the processor 12.

For example, the memory 13 may store various data, such as information about an object obtained using a first sensor 111, motion information of an object obtained using a video or an image of the object obtained using a second sensor 112, and data generated according to the operation of the processor 12. The memory 13 may also store an operating system (OS) and at least one program (e.g., a program necessary for the processor 12 to operate).

The memory 13 may include, for example, random access memory (RAM), such as dynamic random access memory (DRAM) and static random access memory (SRAM), read-only memory (ROM), electrically erasable programmable read-only memory (EEPROM), CD-ROM, Blu-ray or other optical disk storage, a hard disk drive (HDD), a solid state drive (SSD), or flash memory.

The device 10 may also include a display (not shown). The display (not shown) may provide a user with a monitoring image or an interface. Here, the monitoring image may be at least one of an image obtained using an image obtaining device, a pre-stored image, a real-time image, an electronic navigational chart, a map, or a path guidance image, or the like.

The device 10 may further include an input unit (not shown). The input unit may be a user interface that can receive a user input from the user of the device 10. The input unit (not shown) and the display may be implanted in a single hardware element, such as a touch screen.

The processor 12 controls the overall operation of the device 10. For example, the processor 12 may have overall control over the input unit (not shown), the display (not shown), the communication unit 11, the memory 13, and the like by executing programs stored in the memory 13.

The processor 12 may be implemented using at least one of an application specific integrated circuit (ASIC), a digital signal processors (DSP), a digital signal processing device (DSPD), a programmable logic device (PLD), a field programmable gate array (FPGA), a controller, a microcontroller, a microprocessor, and other electrical units for performing functions.

The processor 12 may control the device 10 by executing programs stored in the memory 13. In an example, the processor 12 may perform at least a portion of a method of filtering a virtual image using a plurality of sensors described with reference to FIGS. 3A to 7B. In another example, the processor 12 may perform at least a portion of a ship collision avoidance method described with reference to FIGS. 8 to 16.

For example, the processor 12 may determine whether a candidate object is a real object 121 or a virtual object 122 by using the first sensor 111 and the second sensor 112.

Here, the first sensor 111 may be a sensor capable of detecting a distance to an object. The first sensor 111 may be a sensor that detects a distance to an object by sending a signal toward the object. For example, the first sensor 111 may be at least one of a Radar device and a Lidar device. In addition, the second sensor 112 may be a sensor capable of capturing a video or an image of an object. For example, the second sensor 112 may be a camera, specifically, at least one of a PTZ camera, an EO camera, and an IR camera.

According to an embodiment, the first sensor 111 may detect an object at a first distance from the host ship. However, while the first sensor 111 may detect the presence of an object, the first sensor 111 may be unable to determine whether the detected object is a real object 121 (or a true object) or a virtual object 122 (or a false object). That is, the first sensor 111 is unable to determine whether the detected object is a real object 121, such as a ship, or a virtual object 122, such as a wave.

Throughout the specification, the real object or the true object refers to an object with a fixed physical shape, such as ships, buoys, people, jet skis, yachts, fishing boats, large ships, small ships, waves, reefs, icebergs, islands, that could potentially cause a collision with the host vessel. In contrast, a virtual object or a false object refers to an object detected by a sensor as a potential object but either does not exist or does not pose a collision risk to the host vessel, such as water.

According to an embodiment, the second sensor 112 may be capable of capturing an image of an object at a second distance from the host ship. Here, the first distance may be longer than the second distance. Thus, the second sensor 112 may be capable of detecting only an object at a shorter distance than the first sensor 111, but the second sensor 112 may determine the type of the object detected by the first sensor 111—including whether it is a real object or not.

Accordingly, the processor 12 may determine whether the object detected by the first sensor 111 is a real object 121 or a virtual object 122 by capturing the image of the detected object using the second sensor 112. That is, the processor 12 may filter the virtual object 122 using the first sensor 111 and the second sensor 112.

For example, the processor 12 may obtain object information including the type, direction, speed, and size of the object once the object is determined to be a real object 121, and calculate a risk of collision or provide an avoidance path to avoid a collision between the host vessel and the object by using the obtained information.

Referring to FIG. 2, the processor 12 may determine whether the candidate object is the real object 121 or the virtual object 122 by further using a third sensor 113 in addition to the first sensor 111 and the second sensor 112.

Here, the third sensor 113 may be a sensor that may measure the motion of the host vessel to which the third sensor 113 is attached. For example, the third sensor 113 may detect the direction, speed change, rolling, yawing, pitching, and the like of the host vessel to which the third sensor 113 is attached. For example, the third sensor 113 may be at least one of an inertial measurement unit (IMU), a magnetic sensor (or magnetometer), a global positioning system (GPS) device, a hull angle sensor (or an attitude sensor), and a laser angle measurement device.

The processor 12 may use the second sensor 112 to capture an image of the object detected by the first sensor 111. At this time, a control value by which the the second sensor 112 to capture the image of the object is controlled may be calculated based on the information obtained using the first sensor 111 and the third sensor 113. Thereby, the processor 12 may determine whether the detected object is the real object 121 or the virtual object 122. That is, the processor 12 may filter the virtual object 122 using the first sensor 111, the second sensor 112, and the third sensor 113.

In addition, each of the first sensor 111, the second sensor 112, and the third sensor 113 may be a single sensor or may include a plurality of sensors.

However, sensors used by the device 10 to filter the virtual object are not limited to the first sensor 111, the second sensor 112, and the third sensor 113. That is, the processor 12 may filter the virtual object 122 using at least one sensor or information among a radio detection and ranging (Radar) device 112, an electronic chart (ENC) 113, a light detection and ranging (Lidar) device 114, an automatic identification system (AIS) 116, a sonar 117, an inertial measurement unit (IMU) (not shown), and a host ship database (DB) (not shown).

Figure 3A:
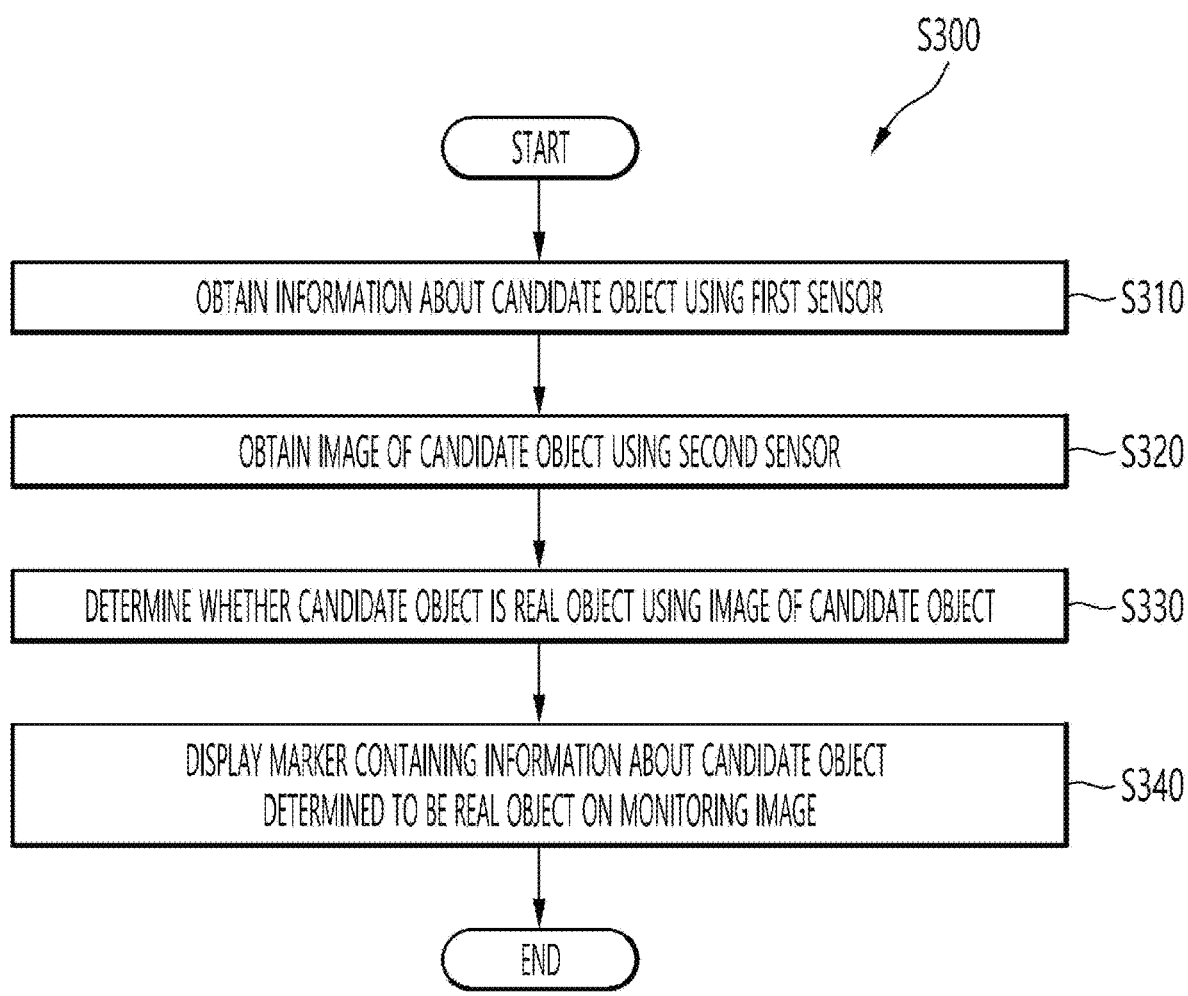
FIG. 3A is a flowchart illustrating an example of a method of filtering a virtual object using a first sensor and a second sensor according to an embodiment.
Figure 3B:
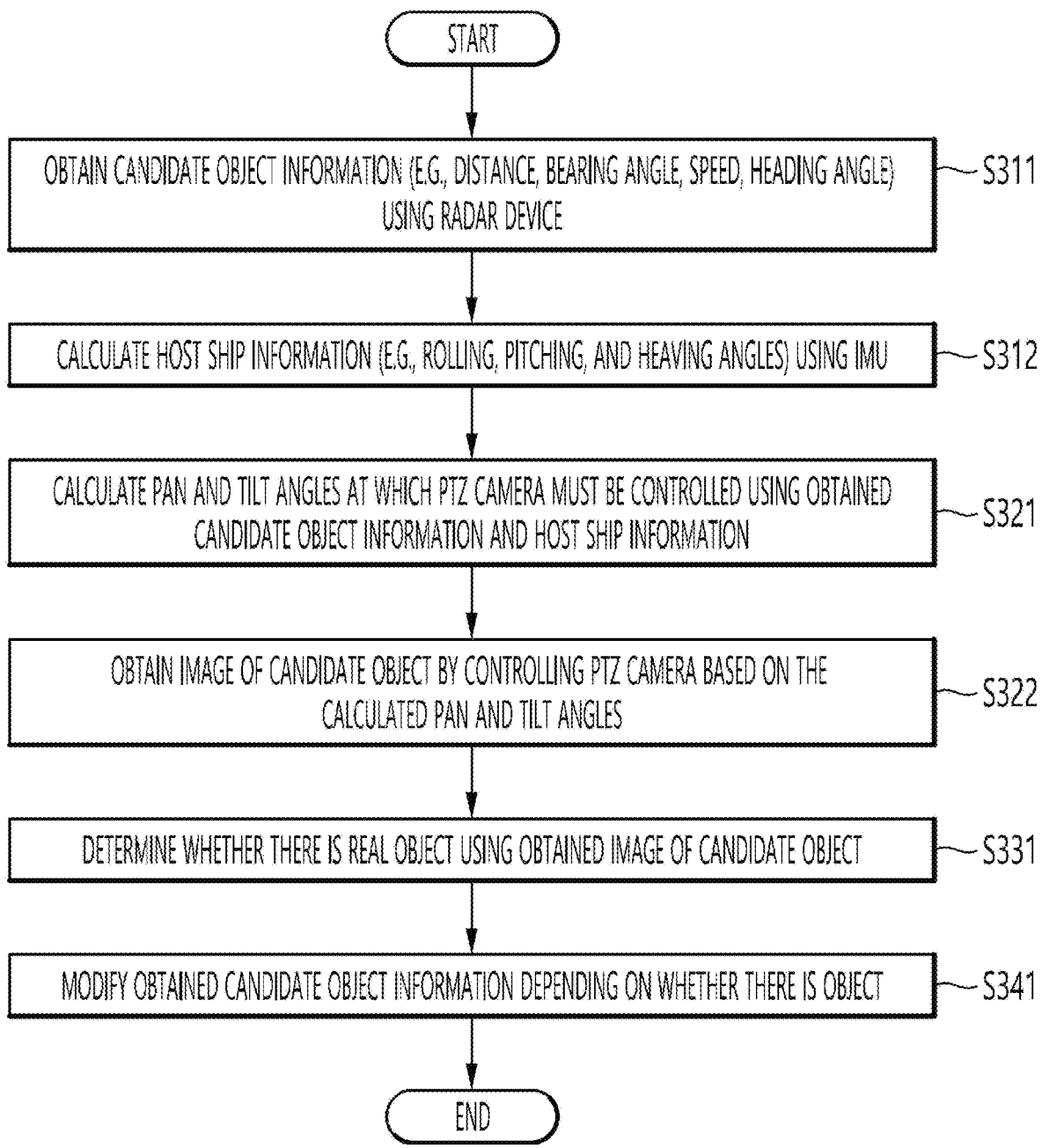
FIG. 3B is a flowchart illustrating another example of a method of filtering a virtual object using a first sensor, a second sensor, and a third sensor according to an embodiment.

FIG. 3A is a flowchart illustrating an example of a method of filtering a virtual object using a first sensor and a second sensor according to an embodiment, and FIG. 3B is a flowchart illustrating another example of a method of filtering a virtual object using a first sensor, a second sensor, and a third sensor according to an embodiment.

Referring to FIG. 3A, an operation S300 may include operations S310, S320, S330, and S340.

In operation S310, the processor 12 may obtain information about a candidate object (hereinafter, referred to as the "candidate object information") using the first sensor. Here, the first sensor is a distance detection sensor capable of detecting an object and detecting a distance to the object. The first sensor may be at least one of a Radar device or a Lidar device.

The processor 12 may detect a candidate object present within a preset distance and obtain the candidate object information. For example, in a case where the first sensor is a Radar device, the processor 12 may obtain the candidate object information using the auto ARPA function of the Radar device. Here, the auto ARPA function of the Radar device may refer to the automatic radar plotting aid (ARPA) function, may be technology used in a radar system of a moving vehicle, such as a ship or an aircraft, and may be a function to track and identify objects.

Accordingly, the processor 12 may detect the candidate object using the Radar device and obtain the candidate object information while tracking the detected candidate object. Here, the candidate object information may include at least one of the distance between the host ship and the candidate object, the bearing angle of the candidate object with respect to the host ship, the speed of the candidate object, the heading angle of the candidate object, and the target ID of the candidate object.

In addition, the processor 12 may store the candidate object information of the detected candidate object in the memory in an array [target ID:{distance, bearing, heading, speed}]. For example, the processor 12 may obtain information about all candidate objects detected by the Radar device and store the obtained information in the memory. In addition, the processor 12 may continuously track the candidate object once detected and continuously or repeatedly store updated candidate object information in the memory.

In operation S320, the processor 12 may capture an image of the candidate object using the second sensor. Here, the second sensor is a sensor to capture an image, and may be at least one of a camera or a PTZ camera.

The processor 12 may determine a control value to control the second sensor based on the candidate object information obtained from the first sensor. For example, the processor 12 may calculate coordinates of the candidate object using the obtained bearing angle and distance of the candidate object in the candidate object information and calculate the control value to control the second sensor based on the calculated coordinates. In some embodiments, the control value of the second sensor may include at least one of the pan, the tilt angle, and zoom values of the PTZ camera. In some embodiments, the control value of the second sensor may include at least one of the pan, tilt angle, and zoom setting values of the PTZ camera which positions the candidate object at the center of a frame of the captured image with a preset size.

The processor 12 may obtain the image of the candidate object by controlling the second sensor based on the calculated control value of the second sensor. In a case where the second sensor is a PTZ camera, the processor 12 may obtain the image of the candidate object by controlling the PTZ camera based on the calculated coordinates. Accordingly, the processor 12 may obtain the image of the candidate object using the controlled second sensor.

In another example, the processor 12 may calculate the control value of the second sensor based on the calculated coordinates and information about the host ship (hereinafter, referred to as the "host ship information"). Here, the host ship information may include information about a position and an angle at which the second sensor is installed and located. For example, the processor 12 may calculate different control values for controlling the PTZ camera depending on the information about the position at which the second sensor is installed and located and the angle of the second sensor. That is, the processor 12 may calculate different control values of the second sensor according to the host ship information, and obtain the image of the candidate object by controlling the PTZ camera based on the control values.

In operation S330, the processor 12 may determine whether the candidate object is a real object using the image of the candidate object.

For example, the processor 12 may use the obtained image of the candidate object to determine whether the object included in the obtained image is a real object. The processor 12 may input the obtained image of the candidate object into an object detection model and obtain, as output data, a result of determining whether the object included in the image of the candidate object is a real object from the object detection model. In other words, the processor 12 may output the result of determining whether the object included in the image obtained using the object detection model is a real object.

The processor 12 may determine whether the candidate object is a real object or a virtual object by determining whether a real object is included in the image of the candidate object obtained using the object detection model.

In operation S340, the processor 12 may display a marker including the information about the candidate object determined to be a real object on the monitoring image.

For example, the monitoring image may include a real-time image, a map, and a chart, and may be a top view or a front view. In addition, the marker displayed on the monitoring image may be in any form that displays the candidate object information. In other words, the marker may include an image, an icon, a video, or a shape of the real object, and may further include text displaying information about the object.

Referring to FIG. 3B, in operation S311, the processor 12 may obtain the candidate object information using the first sensor. Here, the first sensor may be a Radar device. The candidate object information may include at least one of the distance, the bearing angle, the speed, the heading angle, and the target ID of the candidate object.

In operation S312, the processor 12 may calculate the host ship information using a third sensor. Here, the host ship information may include a position, a coordinate, and an angle at which the second sensor is provided, and may further include motion information of the host ship. In some embodiments, the third sensor may be an IMU, and the motion information of the host ship may be information obtained using the third sensor, i.e., information about the motion of the host ship. The motion information of the host ship may include the rolling, pitching, and heaving angles of the host ship (i.e., angles at which the host ship rocks).

In operation S321, the processor 12 may calculate a control value of the second sensor using at least one of the obtained candidate object information and the host ship information. The processor 12 may calculate different control values for controlling the PTZ camera depending on information about the position and angle at which the second sensor is installed and located on the host ship and the motion information of the host ship. In some embodiments, the second sensor may be a PTZ camera, and the control value of the second sensor may include at least one of the pan, the tilt angle, and the zoom value of the PTZ camera.

In operation S322, the processor 12 may obtain the image of the candidate object by controlling the second sensor based on the calculated control value of the second sensor. The image of the candidate object may be an image in which the candidate object detected by the first sensor is positioned within a preset area or range of the frame and captured at a size within a preset size range.

In addition, in operation S331, the processor 12 may determine whether the candidate object is a real object or a virtual object using the obtained image of the candidate object.

In addition, in operation S341, the processor 12 may modify (or delete) the obtained candidate object information depending on whether the object is a real object or a virtual object. Specifically, the processor 12 may modify (or delete) information about the candidate object if it is determined to be a virtual object.

In an additional embodiment, the processor 12 may display a marker containing information about the real object on the monitoring image. In other words, the processor 12 may provide the user with the monitoring image on which the marker containing the information about the real object is displayed.

Figure 4A:
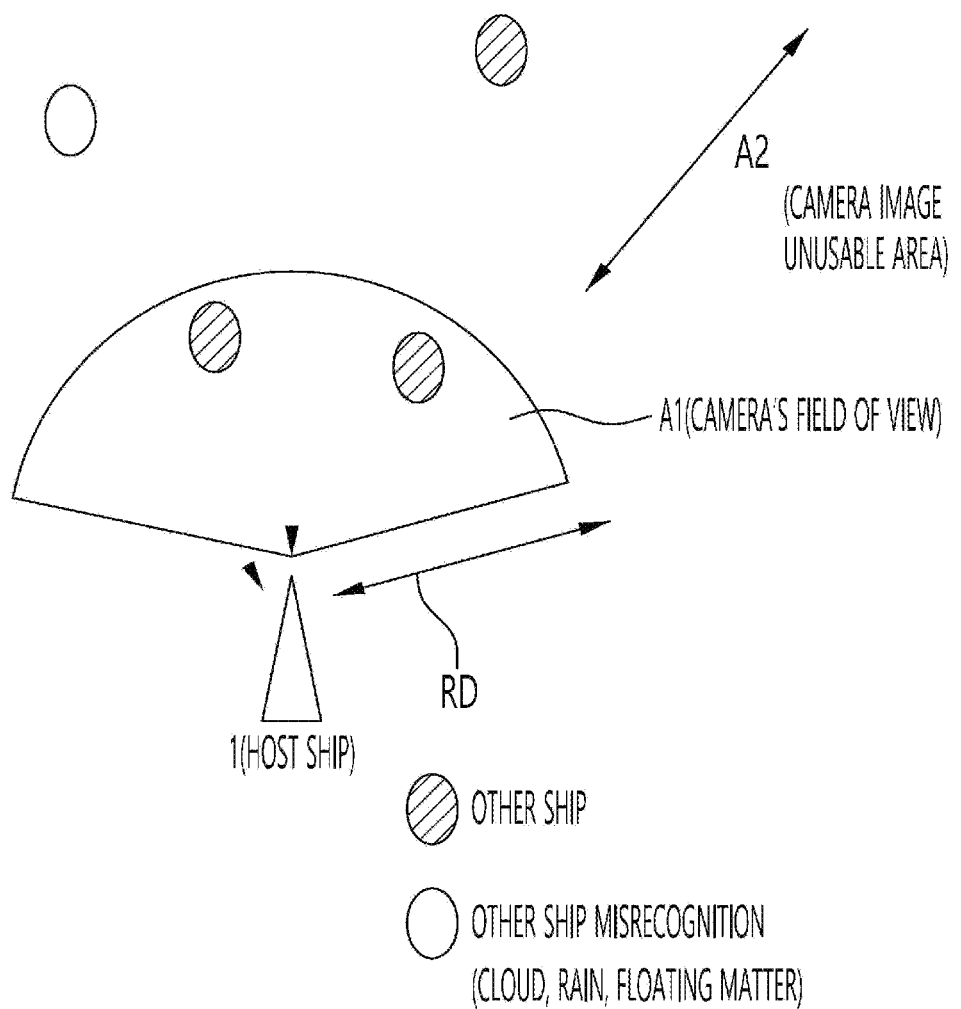
FIG. 4A is a diagram illustrating an example of a camera's field of view and an area where camera images are unusable according to an embodiment.
Figure 4B:
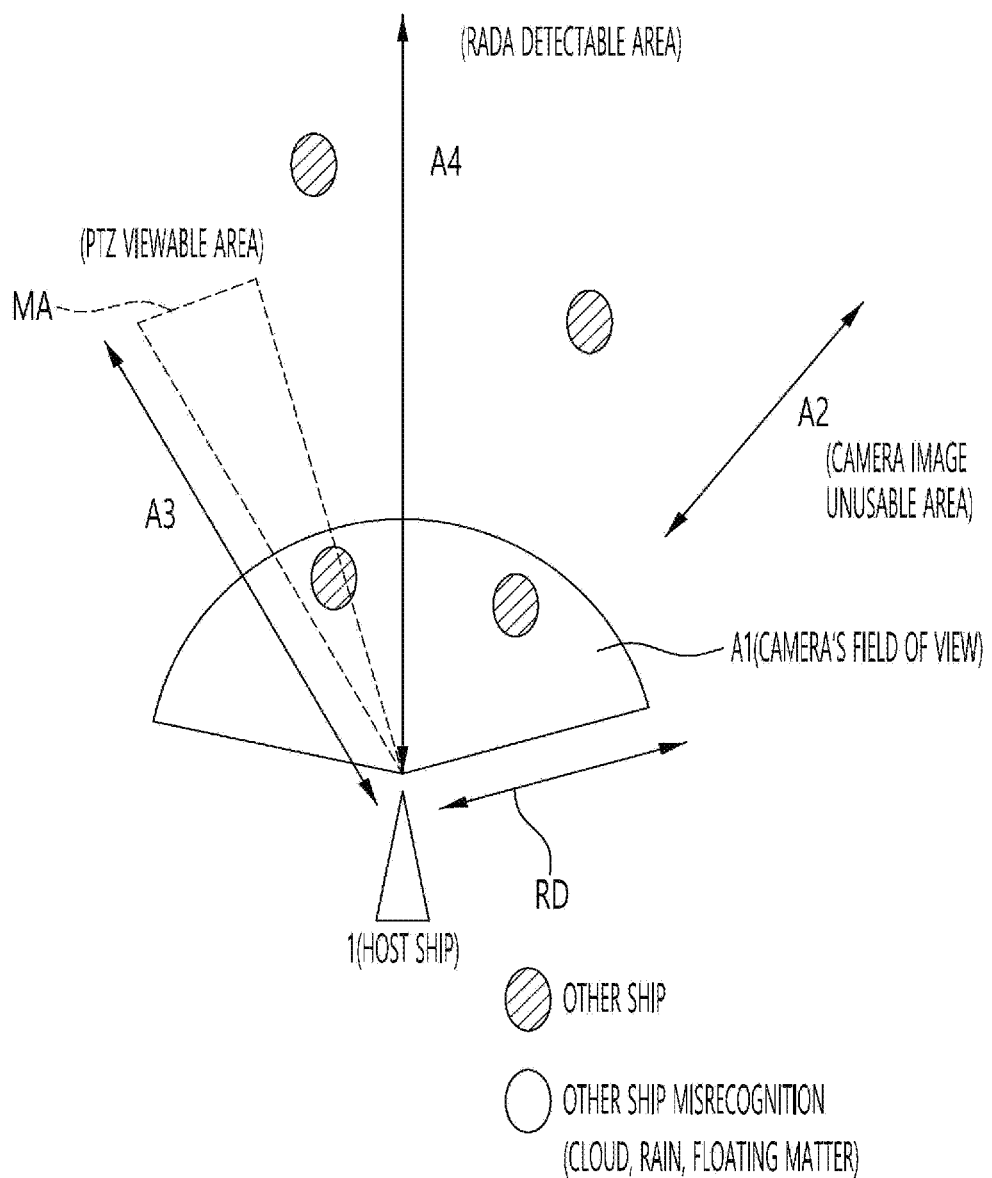
FIG. 4B is a diagram illustrating an example of a camera's field of view, an area where camera images are unusable, a PTZ viewable area, and a radar detectable area, according to an embodiment.

FIG. 4A is a diagram illustrating an example of a camera's field of view and an area where camera images are unusable according to an embodiment, and FIG. 4B is a diagram illustrating an example of a camera's field of view, an area where camera images are unusable, a PTZ viewable area, and a radar detectable area, according to an embodiment.

Hereinafter, an example of a method of obtaining an image of a candidate object by the processor 12 will be described with reference to FIGS. 4A and 4B.

First, referring to FIG. 4A, the second sensor may be a fixed camera. In this case, the processor 12 may obtain an image of a candidate object present within a camera's field of view A1 by using a camera, and may determine whether the candidate object is a real object or a virtual object by using the image of the obtained candidate object to determine.

However, in a case where the camera is a fixed camera, while the second sensor may recognize a candidate object within the camera's field of view A1, the second sensor may not recognize a candidate object in a camera image unusable area A2, thereby causing a distance RD at which the processor may determine whether an object is a real object or a virtual object to be relatively short.

For example, the second sensor may recognize other ships (or candidate objects) within the camera's field of view A1 but may not recognize other ships in the camera image unusable area A2, and may misrecognize a cloud, rain, or floating matter as other ships.

Accordingly, the processor 12 may obtain a more accurate image of the candidate object by obtaining a plurality of images of the candidate object present within the camera's field of view A1 by using a plurality of cameras, or may obtain an image of the candidate object present outside the camera's field of view A1, i.e., in the camera image unusable area A2, by using the PTZ camera.

Referring to FIG. 4B, the second sensor may be a PTZ camera. Because the PTZ camera has a longer viewing distance than a fixed camera, the PTZ camera may look not only in the field of view A1 of the fixed camera but also in the image unusable area A2 of the fixed camera. Because the second sensor may detect not only in the camera's field of view A1 but also in the unusable area A2 of the fixed camera, the performance of filtering a virtual image of the candidate object may be improved and the performance of collision avoidance against misrecognition may be improved.

Accordingly, the processor 12 may recognize an object present within the camera's field of view A1 or the camera image unusable area depending on the type of the second sensor. In an example, in a case where the second sensor is a fixed camera, the processor 12 may recognize an object present within the camera's field of view A1 and determine whether the recognized object is a virtual object or a real object. In another example, in a case where the second sensor is a PTZ camera, the processor 12 may recognize an object present in the camera image unusable area A2 and determine whether the recognized object is a virtual object or a real object.

According to an embodiment, the device 10 may include both a fixed camera and a PTZ camera. When the distance to a candidate object is determined to be within the fixed camera's field of view A1, the processor may control to capture an image of the candidate object using the fixed camera and without using the PTZ camera. In contrast, when the distance to the candidate object is determined to be beyond the fixed camera's field of view A1, the processor may perform determining of control values to control the PTZ camera and then control the PTZ camera to capture the candidate object based on the control values, without using the fixed camera. This approach improves the efficiency and speed for determining whether the candidate object is a real object or not.

According to another embodiment, when the distance to a candidate object is determined to be within the fixed camera's field of view A1, the processor may control both the fixed camera and PTZ camera to respectively capture an image of the candidate object. The processor may determine whether the candidate object is a real object by using both images captured by the fixed camera and the PTZ camera. Specifically, the processor may make a final determination that the candidate object is a real object when both two images from the fixed camera and the PTZ camera are determined to include a real object through the object detection model or when either one of the two images is determined to include a real object through the object detection model.

For example, as described above, the processor 12 may calculate the coordinates of the candidate object using the bearing angle and the distance among the obtained candidate object information. In addition, the processor 12 may control the PTZ camera based on at least one of the calculated coordinates or the host ship information.

For example, the processor 12 may capture an image of the candidate object present at the calculated coordinates using the controlled PTZ camera. That is, the processor 12 may control the direction, the angle, and the zoom function of the PTZ camera to obtain the image of the candidate object present at the calculated coordinates.

In addition, in a case where the processor 12 obtains an image of the candidate object using the PTZ camera, the image of the candidate object may be obtained based on host ship information because the host ship is also moving. Here, the host ship information may include, but is not limited to, the speed and the direction of the host ship, the degree of rolling where the host ship rocks left and right, and the degree of pitching where the host ship rocks back and forth.

That is, the processor 12 may obtain the image of the candidate object by controlling the PTZ camera considering not only the coordinates of the candidate object but also the state of the host ship. At this time, even in a case where the state of the host ship is unstable due to a large degree of rolling or pitching of the host ship due to the weather environment or the maritime environment, the processor 12 may obtain the image of the candidate object by continuously tracking the target ID of the detected object. In addition, the processor 12 may continuously track the target ID of the candidate object and continuously update information for each target ID based on the obtained image.

In addition, even in a case where the candidate object is present in the general camera image unusable area A2, the processor 12 may obtain an image of the candidate object present in a PTZ viewable area MA by using the PTZ camera.

Here, the PTZ viewable area MA may refer to an area where the object information may be reviewed from the image obtained using the PTZ camera. Accordingly, the presence of an object outside the PTZ viewable area MA does not mean that an image of the object cannot be captured by the PTZ camera, and the object may be included in the image obtained using the PTZ camera, but information about the object may not be reviewed.

In addition, the PTZ viewable area MA is a factor that may flexibly change depending on the size of the object, and the size of the PTZ viewable area MA may expand as the size of the object increases and contract as the size of the object decreases.

For example, because a radar detectable area A4 is larger than a PTZ viewable distance A3, even in a case where the processor 12 obtains an image using the PTZ camera, the obtained image is unusable. That is, because the candidate object in the image obtained in this manner is too small, the processor 12 may not be able to determine whether the candidate object is a real object or a virtual object.

Accordingly, in a case where the candidate object detected by the radar is not present in the PTZ viewable area MA, the processor 12 may track the candidate object and continuously update the candidate object information as described above. That is, the processor 12 may track the candidate object and continuously obtain images of the same candidate object.

Accordingly, in a case where the candidate object present outside the PTZ viewable area MA enters the PTZ viewable area MA, the processor 12 may determine whether the candidate object is a real object or a virtual object by using the image of the tracked candidate object.

In an example, in a case where the candidate object detected by the Radar device is present in the PTZ viewable area MA, the processor 12 may obtain an image of the candidate object using the PTZ camera. In addition, the processor 12 may determine whether the candidate object is a real object or a virtual object using the obtained image.

In another example, in a case where the candidate object detected by the Radar device is not present in the PTZ viewable area MA, the processor 12 may track the candidate object and continuously obtain images of the candidate object. Accordingly, the processor 12 may determine whether the candidate object is a real object or a virtual object by using the image when the candidate object enters the PTZ viewable area MA.

In addition, in a case where a plurality of candidate objects are detected by the radar, the processor 12 may preferentially obtain an image of the candidate object closer to the host ship from among the plurality of candidate objects.

That is, avoiding a collision with a candidate object closer to the host ship is given priority over avoiding a collision with a candidate object farther away from the host ship, and the processor 12 may evaluate the risk of collision with the candidate object closer to the host ship or extract a collision avoidance path.

For example, the processor 12 may calculate the coordinates of each of the plurality of candidate objects using information about the plurality of detected candidate objects. Then, the processor 12 may first obtain an image of a candidate object close to the host ship, and then obtain an image of a candidate object that is relatively farther away, based on the calculated coordinates. In other words, the processor 12 may first obtain the image of the candidate object close to the host ship by preferentially controlling the PTZ camera in the direction of the candidate object close to the host ship.

In addition, the processor 12 may determine whether the candidate object is a real object or a virtual object by using the obtained image of the candidate object. For example, the processor 12 may input the obtained image of the candidate object into the object detection model and output a result of determining whether the object included in the obtained image is a virtual object using the object detection model.

Here, the object detection model may be a trained artificial intelligence model. The artificial intelligence model refers to a set of machine learning algorithms using a layered algorithm structure based on a deep neural network in machine learning technology and cognitive science.

For example, the artificial intelligence model may include an input layer receiving an input signal or input data from an external source, an output layer outputting an output signal or data in response to the input data, and at least one hidden layer positioned between the input layer and the output layer to receive a signal from the input layer, extract characteristics from the received signal, and transmit the same to the output layer. The output layer receives a signal or data from the hidden layer and outputs the same to the outside.

Figure 5:
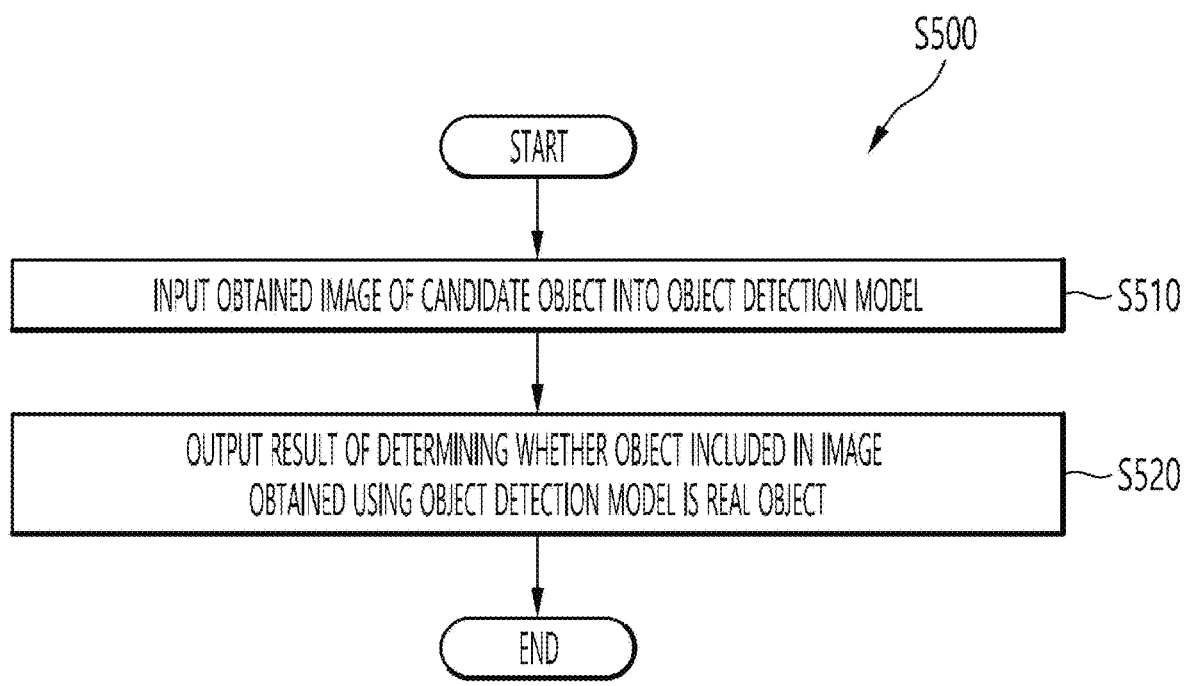
FIG. 5 is a flowchart illustrating an example of determining whether a candidate object is a real object or a virtual object using an object detection model according to an embodiment.

FIG. 5 is a flowchart illustrating an example of determining whether a candidate object is a real object or a virtual object using an object detection model according to an embodiment.

Hereinafter, a method of determining whether a candidate object is a real object or a virtual object by the processor 12 using the object detection model will be described with reference to FIG. 5.

Referring to FIG. 5, an operation S500 may include operations S510 and S520.

In operation S510, the processor 12 may input an obtained image of a candidate object into the object detection model. The object detection model may be an artificial intelligence model trained using actual navigation images and images of objects (e.g. ships, buoys, people, jet skis, yachts, fishing boats, large ships, small ships, waves, reefs, icebergs, islands, etc.) as learning data.

The processor 12 may use the image of the candidate object obtained using the second sensor as input data for the object detection model. The processor 12 may retrain or verify the object detection model using the image of the candidate object.

In operation S520, the processor 12 may output a result of determining whether the object included in the image obtained using the object detection model is a real object.

For example, the processor 12 may output a result of determining whether the object is included in the image obtained using the object detection model.

Specifically, the object detection model may determine 1 when the obtained image includes an object and may determine 0 when the obtained image does not include the object. In other words, the object detection model may output 1 or 0 as output data.

In an example, in a case where the probability that an object is included in the obtained image is a preset value or higher, the object detection model may determine that the obtained image includes an object and output 1, and thus the processor 12 may determine that the object (or the candidate object) included in the obtained image is a real object. In another example, in a case where the probability that an object is included in the obtained image is lower than the preset value, the object detection model may determine that the obtained image does not include an object and output 0, and thus the processor 12 may determine that the object (or the candidate object) included in the image is a virtual object.

In addition, the processor 12 may display a marker containing information about the candidate object determined to be a real object on the monitoring image.

Here, the marker may include at least one of the bounding box of the object, the distance between the host ship and the real object, the bearing angle of the real object with respect to the host ship, the heading angle of the real object, the speed of the real object, and the target ID of the real object. In addition, the marker may be displayed as a real image, an icon, a shape, or the like of the real object, but is not limited thereto.

For example, the processor 12 may provide the user with a monitoring image on which the marker containing information about a real object excluding virtual objects among candidate objects is displayed. In other words, the processor 12 may store information about all detected candidate objects in the memory and delete information about a candidate object determined to be a virtual object from among the stored information about the candidate objects. Accordingly, the processor 12 may provide a monitoring image on which a marker containing only information about the candidate object determined to be a real object is displayed.

In an example, the monitoring image may be a real-time image on which a marker containing information about a candidate object determined to be a real object is displayed. In another example, the monitoring image may be an electronic navigation chart image on which a marker containing information about a candidate object determined to be a real object is displayed.

Figure 6A:
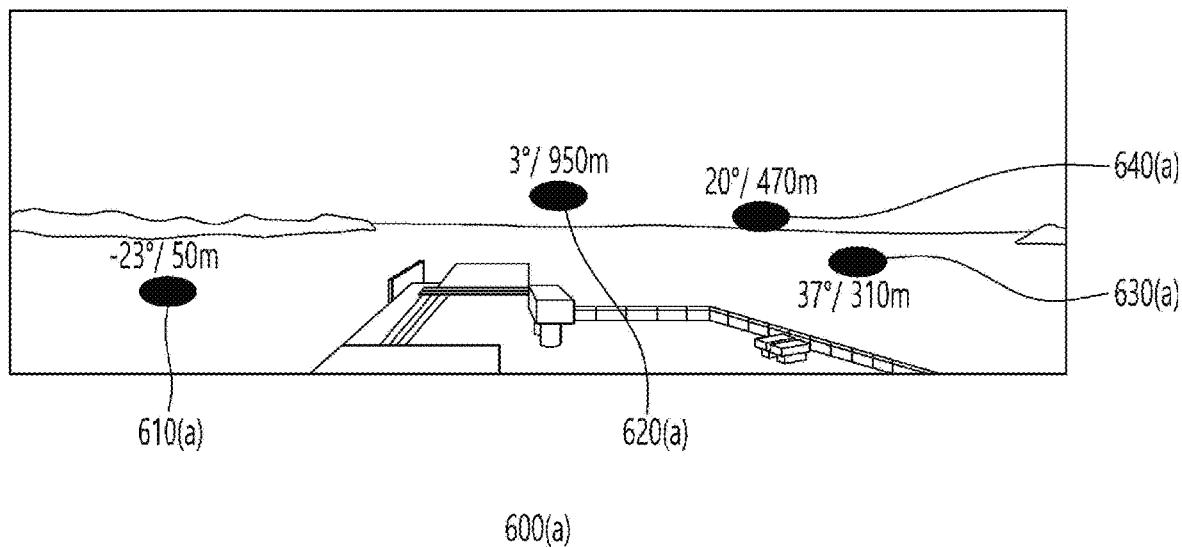
FIGS. 6A and 6B are diagrams illustrating an example of displaying a marker on a monitoring image according to an embodiment.
Figure 6B:
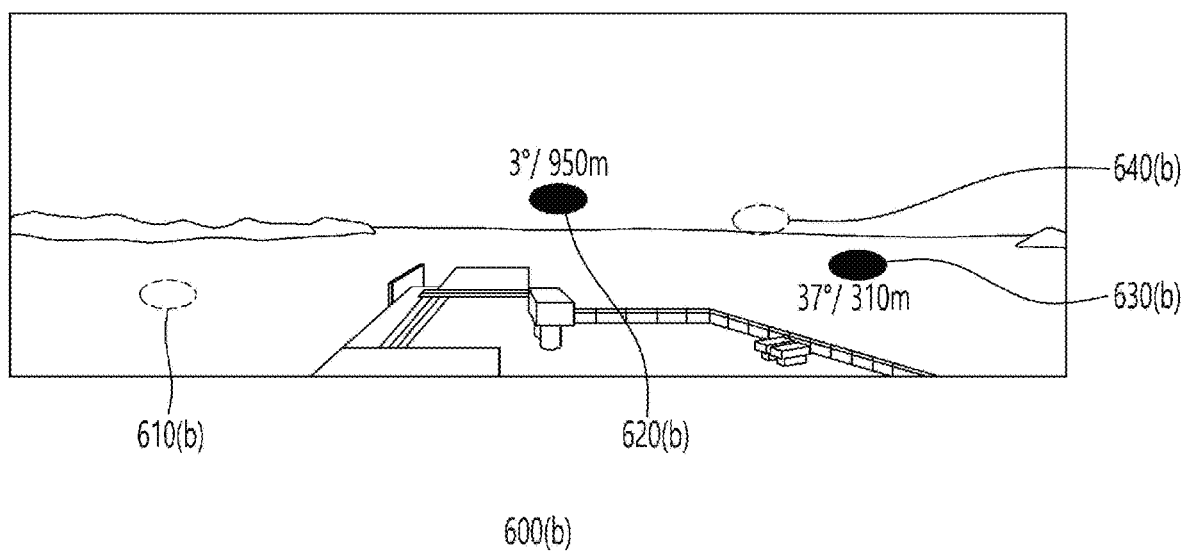

FIGS. 6A and 6B are diagrams illustrating an example of displaying a marker on a monitoring image according to an embodiment, and FIGS. 7A and 7B are diagrams illustrating another example of displaying a marker on a monitoring image according to an embodiment.

Hereinafter, exemplary embodiments of monitoring images displaying markers will be described with reference to FIGS. 6A, 6B and 7A, 7B.

First, referring to FIGS. 6A and 6B, the processor 12 may display a marker of an object on a monitoring image. In FIGS. 6A, 6B and 7A, 7B, the marker is shown as containing only a portion of candidate object information, but the marker may include at least one of the distance between the host ship and a real object, the bearing angle of the real object with respect to the host ship, the heading angle of the real object, the speed of the real object, and the target ID of the real object.

Referring to FIG. 6A, the processor 12 may display markers 610(*a*), 620(*a*), 630(*a*), and 640(*a*) of all candidate objects on a monitoring image 600(*a*). The processor 12 may provide a user with a real-time image on which the markers 610(*a*), 620(*a*), 630(*a*), and 640(*a*) of all candidate objects by displaying the same are displayed.

Referring to FIG. 6B, the processor 12 may display markers 620(*b*) and 630(*b*) of candidate objects determined to be real objects on a monitoring image 600(*b*). That is, the processor 12 may determine whether the candidate objects is a real object or a virtual object by using obtained images of the candidate objects, and may not display the markers of the candidate objects 610(*b*) and 640(*b*) determined to be virtual objects on the monitoring image or delete or modify information about the candidate objects 610(*b*) and 640(*b*) determined to be virtual objects from the memory. Accordingly, the processor 12 may provide the user with the real-time image on which only the markers 620(*b*) and 630(*b*) containing information about the candidate objects determined to be real objects are displayed.

In some embodiments, the processor 12 may selectively provide the user with the monitoring image 600(*a*) before virtual image filtering. For example, the monitoring image 600(*a*) before virtual image filtering may not be provided to the user, and only the monitoring image 600(*b*) after virtual image filtering described later may be provided to the user.

Referring to FIGS. 7A and 7B, the processor 12 may provide the user with at least one of an electronic navigational chart monitoring image 700(*a*) on which markers are displayed and an enlarged electronic navigational chart monitoring image 700(*b*) obtained by enlarging a portion of the electronic navigational chart monitoring image 700(*a*).

For ease of explanation, referring to the enlarged electronic navigational chart monitoring image 700(*b*), the processor 12 may provide the user with an electronic navigational chart on which markers of candidate objects are displayed. The candidate objects may be a real object or a virtual object. In some embodiments, the processor 12 may display only the markers of real objects. The processor 12 may determine whether the candidate object is a real object or a virtual object by using the obtained image of the candidate object, and may not display the markers of the candidate object 730 determined to be a virtual object on the monitoring image or delete or modify information about the candidate object 730 determined to be a virtual object from the memory. Accordingly, the processor 12 may provide the user with the electronic navigational chart on which only the marker 720 containing information about the candidate object determined to be a real object is displayed.

In addition, the processor 12 may use the method of filtering a virtual object using a plurality of sensors described above with reference to FIGS. 1 to 7B as a portion of the ship collision avoidance method described below with reference to FIGS. 8 to 16. That is, the processor 12 may perform at least a portion of the method of filtering a virtual object using a plurality of sensors in the process of performing the ship collision avoidance method for autonomous navigation.

Figure 8:
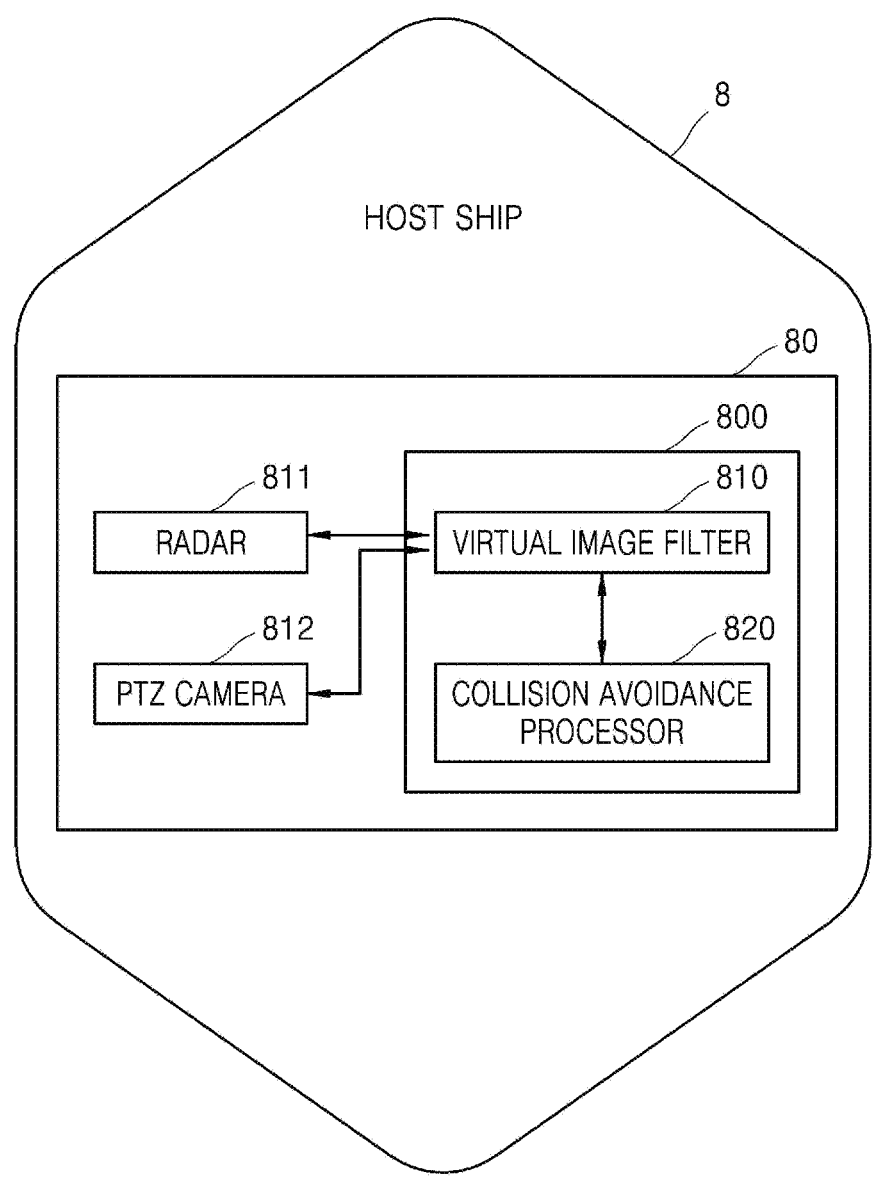
FIG. 8 is an example functional block diagram illustrating an example of a ship collision avoidance device according to an embodiment.

FIG. 8 is an example functional block diagram illustrating an example of a ship collision avoidance device according to an embodiment.

Referring to FIG. 8, the ship collision avoidance device 80 according to an embodiment of the present disclosure may include a Radar device 811, a PTZ camera 812, a virtual image filter 810, and a collision avoidance processor 820.

The Radar device 811 may be disposed on a host ship 8 and may detect objects located around the host ship 8. For example, the Radar device 811 may emit electromagnetic waves around the host ship and detect an object by receiving and based on the electromagnetic waves reflected from the object around the host ship, and thus may output a signal including information about the detected object to the virtual image filter 810 or the collision avoidance processor 820.

The PTZ camera 812 may be disposed on the host ship 8 and may obtain images at a preset distance RD or more from the host ship 8. For example, the PTZ camera 812 is a camera having a pan-tilt-zoom (PTZ) function, and may control the direction to a specific area around the host ship 8, zoom in and out an image to be captured in a specific area, and thus output the captured image of the specific area to the virtual image filter 810 or the collision avoidance processor 820.

The virtual image filter 810 may remove information about a virtual object by filtering information about the object captured by the Radar device 811 based on the image obtained by the PTZ camera 812. For example, in pieces of object information of images detected by the Radar device 811, the virtual image filter 810 may delete information about objects determined to be virtual images based on an image obtained in an area viewable by the PTZ camera 812 from among pieces of object information detected by the Radar device 811, with respect to an area not viewable by a general camera. Accordingly, in the present disclosure, object recognition may be performed even in the general camera image unusable area A2 by using the PTZ camera 812 and the virtual image filter 810.

In other words, the virtual image filter 810 may perform at least a portion of the method of filtering a virtual object using a plurality of sensors described above with reference to FIGS. 1 to 7B.

The collision avoidance processor 820 may determine a direction angle and a speed for collision avoidance based on the object information filtered by the virtual image filter 810 and provide direction angle information and speed information. For example, the collision avoidance processor 820 may determine the direction angle and the speed, at which a collision with the object, for example, another ship, may be prevented, by using information about real objects present around the host ship 8 from which the virtual objects are deleted, and provide the resultant direction angle information and speed information to a controller that controls direction angle and a speed of the host ship.

In the present disclosure, for example, the virtual image filter 810 and the collision avoidance processor 820 may be implemented in the signal processor 800, and each of the virtual image filter 810 and the collision avoidance processor 820 may be implemented as hardware or software in at least one integrated circuit (IC) embedded in the avoidance device 80, and is not particularly limited to either one.

For respective drawings of the present disclosure, unnecessarily duplicate descriptions for the same reference numerals and components having the same function may be omitted, and possible differences between the respective drawings may be described.

Figure 9:
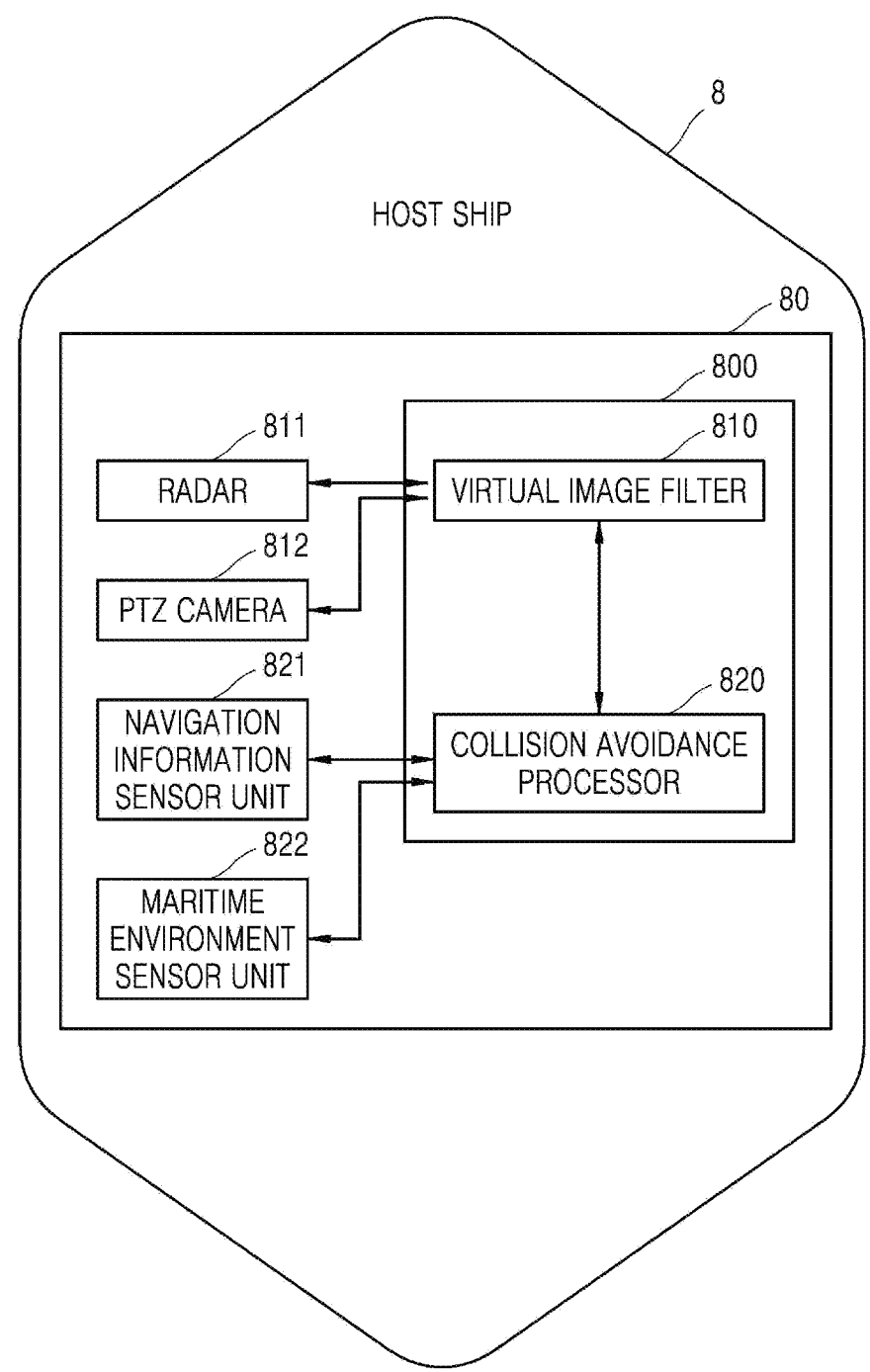
FIG. 9 is an example functional block diagram illustrating another example of a ship collision avoidance device according to an embodiment.

FIG. 9 is an example functional block diagram illustrating another example of a ship collision avoidance device according to an embodiment.

Referring to FIG. 9, the ship collision avoidance device 80 may additionally include a navigation information sensor unit 821 and a maritime environment sensor unit 822.

The navigation information sensor unit 821 is disposed on the host ship 8, and may detect navigation information of the host ship 8. For example, the navigation information sensor unit 821 may include at least one of a gyro sensor, a GPS sensor, a speed log, and a rudder, but is not limited thereto. In an example, the navigation information sensor unit 821 may obtain the navigation information of the host ship 8 using information from at least one of the gyro sensor, the GPS sensor, the speed log, and the rudder.

The maritime environment sensor unit 822 may be disposed on the host ship 8 to sense information about the maritime environment around the host ship 8. For example, the maritime environment sensor unit 822 may include at least one of an echo-sounder and an anemometer, but is not limited thereto. In an example, the maritime environment sensor unit 822 may obtain information about the maritime environment using information from at least one of the echo-sounder and the anemometer.

The collision avoidance processor 820 may determine the risk of the host ship 8 and provide risk information, based on the navigation information from the navigation information sensor unit 821 and the maritime environment information from the maritime environment sensor unit 822. For example, the collision avoidance processor 820 may determine the risk information by comparing each piece of additionally obtained information with preset reference information.

Figure 10:
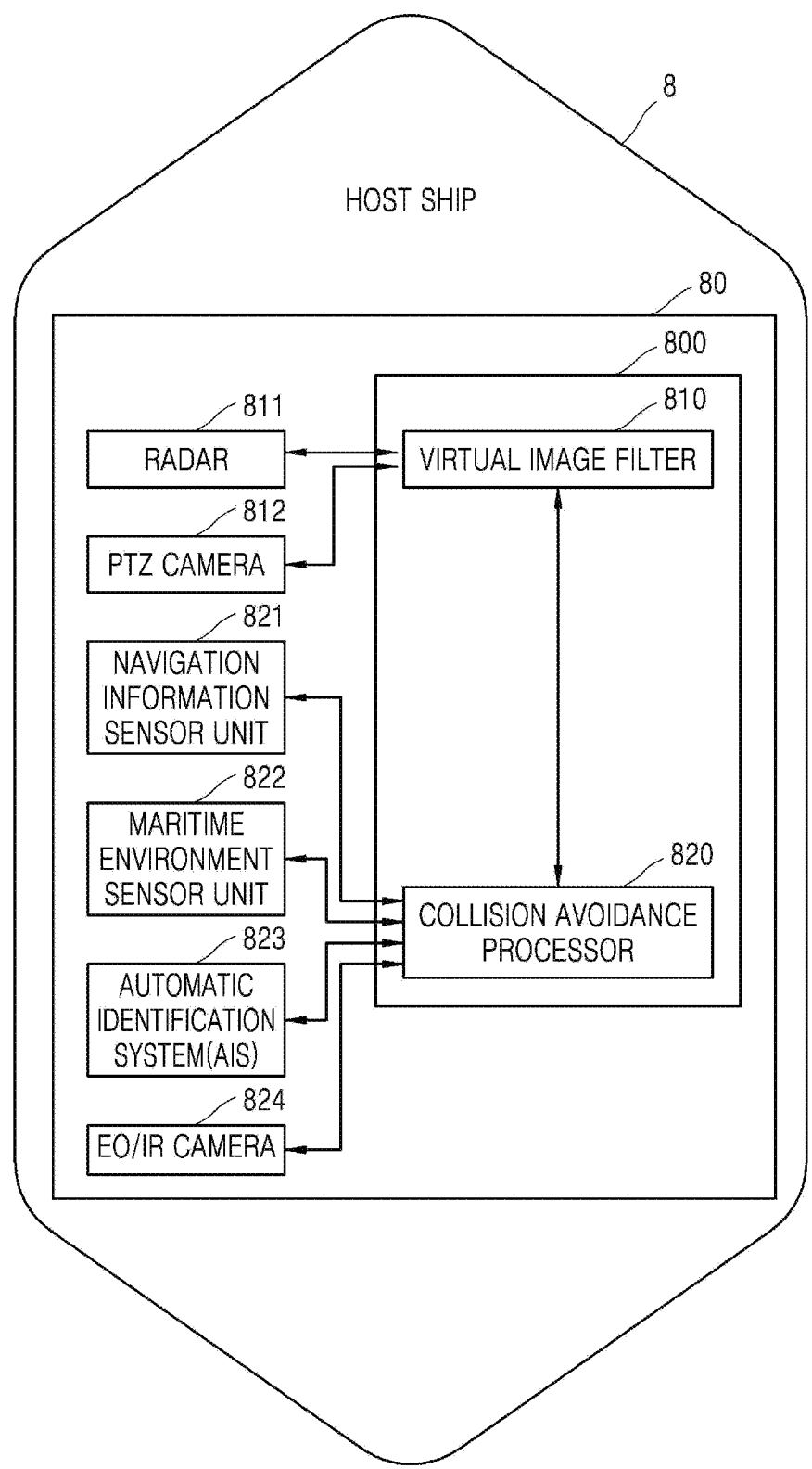
FIG. 10 is an example functional block diagram illustrating another example of a ship collision avoidance device according to an embodiment.

FIG. 10 is an example functional block diagram illustrating another example of a ship collision avoidance device according to an embodiment.

Referring to FIG. 10, the ship collision avoidance device 80 may additionally include an automatic identification system (AIS) 823 and an EO/IR camera 824.

The EO/IR camera 824 may be disposed on the host ship 8 to capture images of objects within a preset distance RD from the host ship 8. For example, the EO/IR camera 824 may include at least one of an EO camera module and an IR camera module, and may be a thermal imaging camera used to improve object image quality of a Radar device.

The automatic identification system (AIS) 823 may automatically recognize a ship based on the object information filtered by the virtual image filter 810. For example, the automatic identification system (AIS) 823 may be used to prevent ship collisions, may track the motion of a ship and collect information about the navigation of ship, and may provide the information collected in this manner to the collision avoidance processor 820.

The collision avoidance processor 820 may improve image quality by correcting the object information filtered by the virtual image filter 810 based on the information from the automatic identification system (AIS) 823 and the information from the EO/IR camera 824 and determine the object type corresponding to the object information.

For example, the collision avoidance processor 820 may improve the image quality of the object information from the virtual image filter 810 by using the information from the automatic identification system (AIS) 823 and the EO/IR camera 824, and distinguish the types of obtained objects (e.g., a fishing ship, a merchant ship, a special ship, and a warship).

Figure 11:
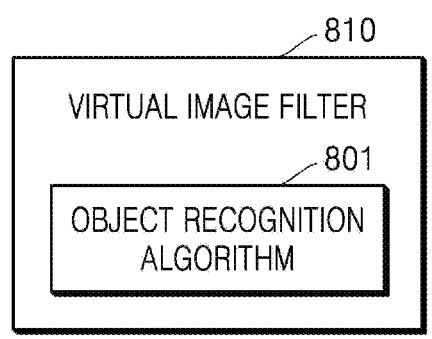
FIG. 11 is a diagram illustrating an example of an object recognition algorithm of a virtual image filter according to an embodiment.

FIG. 11 is a diagram illustrating an example of an object recognition algorithm of a virtual image filter according to an embodiment.

Referring to FIG. 11, the virtual image filter 810 may include an object recognition algorithm 801.

The object recognition algorithm 801 may receive an image obtained by the PTZ camera 812 and recognize an object included in the image, and may recognize a real object in the image obtained by the PTZ camera 812 by using the object recognition algorithm 801.

For example, the object recognition algorithm 801 may be an algorithm trained by an artificial intelligence learning model with sufficient information about between a real object or a non-object, such as a cloud, rain, or floating matter.

For example, the virtual image filter 810 may further include the object detection model described above with reference to FIG. 5. Accordingly, the object recognition algorithm 801 may be an algorithm trained through the object detection model described above with reference to FIG. 5.

For example, the object recognition algorithm 801 may receive an image obtained by the PTZ camera 812 and recognize objects included in the image, and recognize real objects (or true objects) in the image obtained by the PTZ camera 812 by using the object recognition algorithm 801.

In an additional embodiment, the ship collision avoidance device 80 may automatically recognize real objects (or true objects) recognized by the virtual image filter 810 using the automatic identification system (AIS).

In addition, the ship collision avoidance device 80 may capture an image of each object recognized by the virtual image filter 810 using at least one of a fixed camera or a PTZ camera provided on the host ship 8.

Accordingly, the ship collision avoidance device 80 may determine the type of the object using the object information obtained using the automatic ship identification device and the information about the object captured by at least one of the fixed camera or the PTZ camera.

Hereinafter, a ship collision avoidance method will be described with reference to FIGS. 12 to 16. In the present disclosure, the description of the ship collision avoidance method and the description of the ship collision avoidance device may complement or be applied in common with each other, unless there are special circumstances or the descriptions are particularly mutually exclusive.

Figure 12:
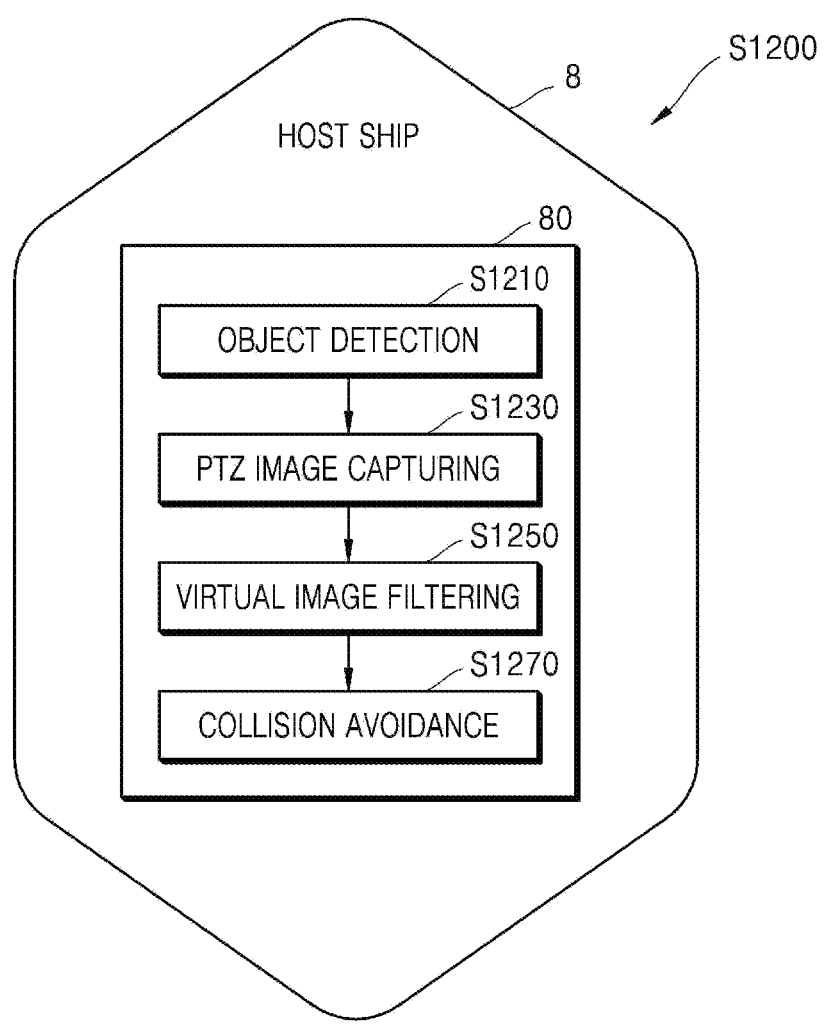
FIG. 12 is a flowchart illustrating an example of a ship collision avoidance method according to an embodiment.

FIG. 12 is a flowchart illustrating an example of a ship collision avoidance method according to an embodiment.

Referring to FIG. 12, a ship collision avoidance method S1200 according to an embodiment of the present disclosure may include an object detection operation S1210, a PTZ image capturing operation S1230, a virtual image filtering operation S1250, and a collision avoidance operation S1270.

In the object detection operation S1210, the ship collision avoidance device 80 may detect an object located around the host ship 8 using the Radar device 811 disposed on the host ship 8.

In the PTZ image capturing operation S1230, the ship collision avoidance device 80 may capture images at a preset distance RD or more from the host ship 8 by using the PTZ camera 812 disposed on the host ship 8.

In the virtual image filtering operation S1250, the ship collision avoidance device 80 may filter the obtained images by the virtual image filter 810 to remove information about virtual objects from information about the objects detected by the Radar device 811.

In the collision avoidance operation S1270, the ship collision avoidance device 80 may determine the direction angle and the speed of the host ship using the collision avoidance processor 820. The collision avoidance processor 820 may determine the direction angle and speed of the host ship for collision avoidance based on the filtered object information, and provide the determined direction angle and speed information of the host ship to the user.

Figure 13:
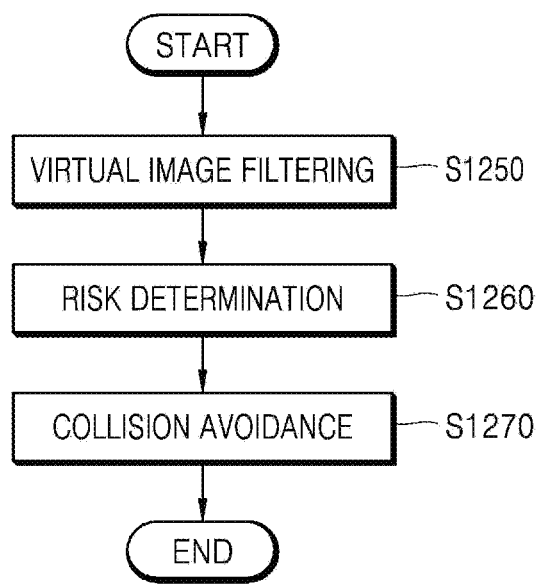
FIG. 13 is a diagram illustrating an example of a risk determination operation according to an embodiment.

FIG. 13 is a diagram illustrating an example of a risk determination operation according to an embodiment.

Referring to FIG. 13, the ship collision avoidance method S1200 may further include a risk determination operation S1260.

In the risk determination operation S1260, the ship collision avoidance device 80 may obtain navigation information from the navigation information sensor unit 821 using the collision avoidance processor 820 and obtain the maritime environment information from the maritime environment sensor unit 822. In addition, the ship collision avoidance device 80 may determine the risk of the host ship 8 based on the obtained navigation information and maritime environment information and provide information about the determined risk to the user.

For example, the ship collision avoidance device 80 may determine the risk of the host ship 8 and perform the collision avoidance operation S1270 in a case where the risk is at a preset risk level or higher.

Figure 14:
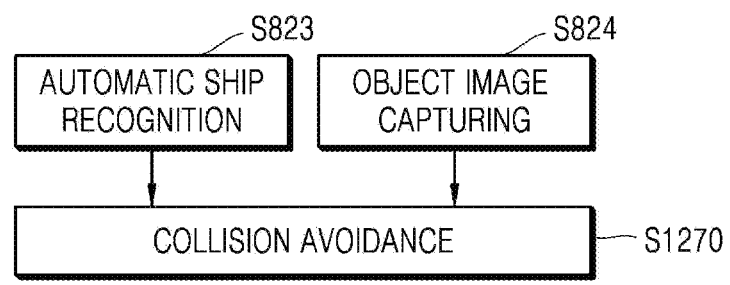
FIG. 14 is a diagram illustrating an example of an automatic ship recognition operation and an object image capturing operation according to an embodiment.

FIG. 14 is a diagram illustrating an example of an automatic ship recognition operation and an object image capturing operation according to an embodiment.

Referring to FIG. 14, the object detection operation S1210 may include an automatic ship recognition operation S823 and an object image capturing operation S824.

In the automatic ship recognition operation S823, the ship collision avoidance device 80 may automatically recognize ships using the ship automatic identification system (AIS) 823 based on the object information filtered by the virtual image filter 810.

In the object image capturing operation S824, the ship collision avoidance device 80 may capture an image of each object within a preset distance RD from the host ship 8 using the EO/IR camera 824 disposed on the host ship 8.

In the collision avoidance operation S1270, the ship collision avoidance device 80 may improve the image quality by correcting the object information filtered by the virtual image filter 810 based on information from the automatic identification system (AIS) 823 and information from the EO/IR camera 824 and determine the type of the object corresponding to the object information.

In addition, the present disclosure, the processor included in the device for filtering a virtual object using a plurality of sensors is described as performing at least a portion of the method for filtering a virtual object using a plurality of sensors, and the ship collision avoidance device is described as performing at least a portion of the ship collision avoidance method for autonomous navigation, but the present disclosure is not limited thereto. That is, the device for filtering a virtual object using a plurality of sensors and the ship collision avoidance device may be formed as a single device, such that a single processor may perform at least a portion of the method of filtering a virtual object using a plurality of sensors and the ship collision avoidance method for autonomous navigation, and the processor included in each device may perform at least a portion of each method.

Accordingly, the processor 12 may obtain images of the candidate objects using at least one sensor, determine a real object among the candidate objects using the obtained images of the candidate objects, and provide an avoidance path to avoid a collision between the host ship and the determined real object.

Figure 15:
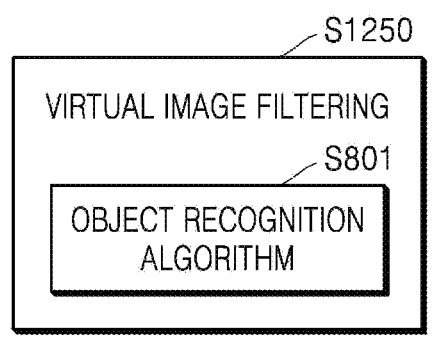
FIG. 15 is a diagram illustrating an example of a virtual image filtering operation according to an embodiment.

FIG. 15 is a diagram illustrating an example of a virtual image filtering operation according to an embodiment.

Referring to FIG. 15, in the virtual image filtering operation S1250, the ship collision avoidance device 80 may recognize objects included in the image captured by the PTZ camera 812 by using the object recognition algorithm S801.

In addition, the ship collision avoidance device 80 may recognize each object included in the obtained image and determine whether the object is a real object or a virtual object.

Accordingly, the ship collision avoidance device 80 may determine the direction angle and the speed of the host ship for collision avoidance based on information about the object determined to be a real object, and display an avoidance path determined based on the determined heading angle and speed on the monitoring image.

In addition, the ship collision avoidance device 80 may include the object detection model described above with reference to FIG. 5. Accordingly, the ship collision avoidance device 80 may determine whether the candidate object is a real object using the object detection model and determine the direction angle and the speed of the ship for collision avoidance based on the information about the object determined to be a real object.

Figure 16:
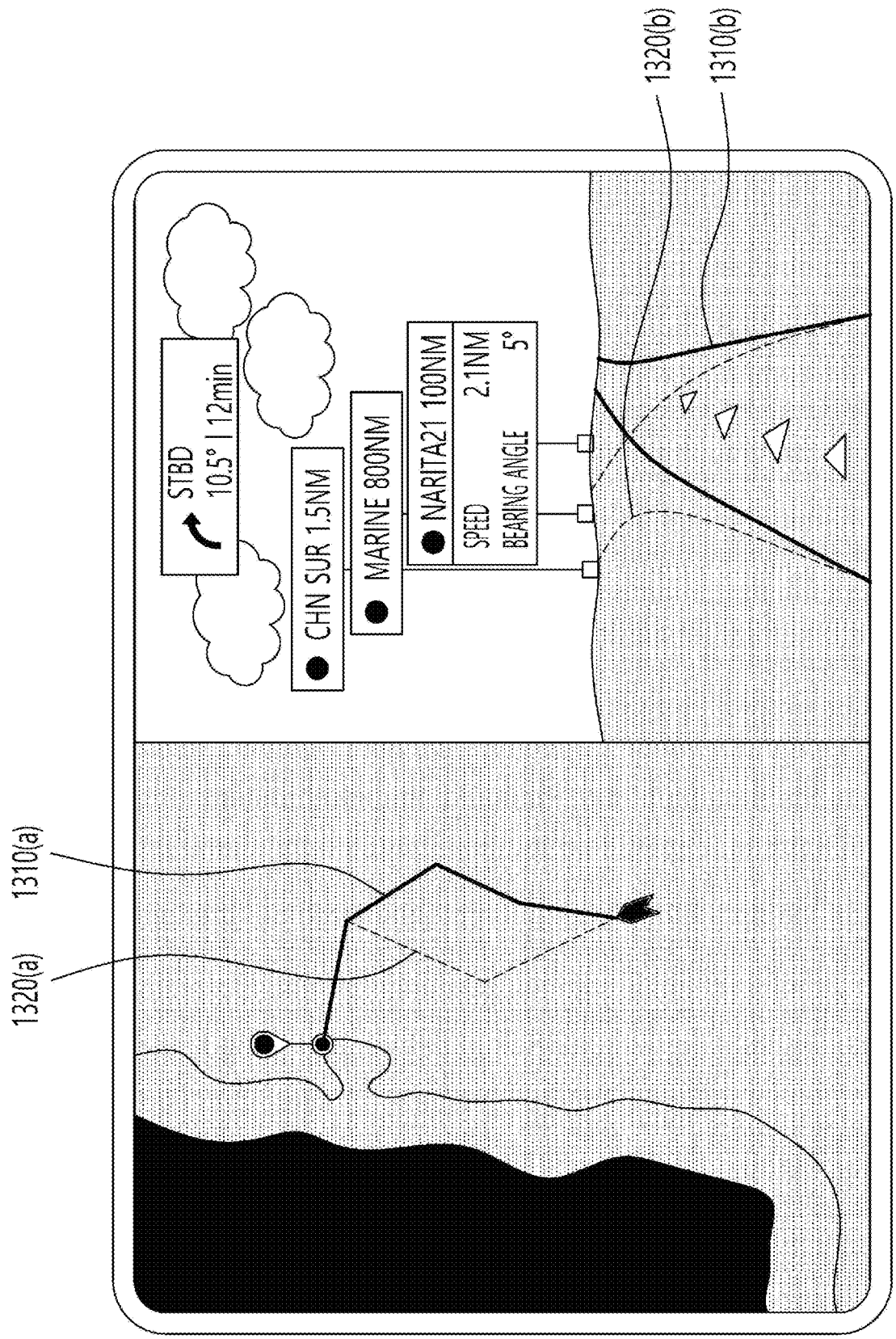
FIG. 16 is a diagram illustrating an example of a collision avoidance operation according to an embodiment.

FIG. 16 is a diagram illustrating an example of a collision avoidance operation according to an embodiment.

Referring to FIG. 16, the ship collision avoidance device 80 may display ship avoidance paths 1320(*a*) and 1320(*b*) on the monitoring image to avoid a collision with an object determined to be a real object.

For example, the ship collision avoidance device 80 may determine the direction angle and the speed of the host ship to avoid a collision with the object determined to be a real object. The ship collision avoidance device 80 may control the steering device of the host ship based on the determined direction angle and control a propulsion device of the host ship based on the determined speed to avoid a collision with the object.

The ship collision avoidance device 80 may display the avoidance paths 1320(*a*) and 1320(*b*) determined based on the determined direction angle and speed on the monitoring image. For example, in a case where there is a risk of collision with an object (e.g., another ship) determined to be a real object, the ship collision avoidance device 80 may display the avoidance paths 1320(*a*) and 1320(*b*) along with existing paths 1310(*a*) and 1310(*b*) on the monitoring image. In an example, the ship collision avoidance device 80 may display the avoidance path 1320(*a*) on the electronic navigational chart monitoring image. In another example, the ship collision avoidance device 80 may display the avoidance path 1320(*b*) on the real-time monitoring image.

In addition, the above-described method may be recorded as a program executable on a computer, and may be implemented in a general-purpose digital computer that runs the program using a computer-readable recording medium. In addition, the data structure used in the above-described method may be recorded on a computer-readable recording medium by various means. The computer-readable recording media include storage media such as magnetic storage media (e.g., ROM, RAM, USB, floppy disk, hard disk, and the like) and optical read media (e.g., CD-ROM, DVD, and the like).

A person having ordinary skill in the art to which the embodiments of the present disclosure pertain will appreciate that the embodiments may be modified without departing from the essential characteristics of the above description. Also, it is noted that any one feature of an embodiment of the present disclosure described in the specification may be applied to another embodiment of the present disclosure. Similarly, the present invention encompasses any embodiment that combines features of one embodiment and features of another embodiment. Therefore, the above-described methods should be considered in an illustrative rather than a limiting sense, the scope of protection is defined by the appended claims rather than by the foregoing description, and all differences within the scope of equivalents thereof should be construed as being included in the disclosure.

The invention claimed is:

1. A method of filtering a virtual object using a plurality of sensors, the method comprising:
    obtaining information about a candidate object using a first sensor;
    obtaining an image of the candidate object using a second sensor by controlling the second sensor based on motion information of a host ship obtained by a third sensor and location information and angle information of the second sensor;
    determining whether the candidate object is a real object using the image of the candidate object; and
    displaying a marker containing information about the candidate object determined to be a real object on a monitoring image,
    wherein the motion information of the host ship includes information on rolling, yawing, pitching of the host ship,
    wherein the controlling the second sensor comprises controlling the second sensor by calculating at least one of a pan value, a tilt angle and a zoom value of the second sensor corresponding to the motion information of the host ship.

2. The method of claim 1, wherein
    the information about the candidate object comprises a bearing angle and a distance of the candidate object, and
    the obtaining the image of the candidate object comprises:
        calculating coordinates of the candidate object using the bearing angle and the distance of the candidate object; and
        controlling the second sensor based on the calculated coordinates; and
        obtaining the image of the candidate object using the controlled second sensor.

3. The method of claim 2, wherein the controlling the second sensor comprises
    calculating one of a pan, a tilt, and a zoom value of the second sensor based on the calculated coordinates so that the candidate object is at a preset position in a frame.

4. The method of claim 1, further comprising obtaining motion information of the host ship using the third sensor, wherein
    the obtaining the image of the candidate object comprises:
        controlling the second sensor based on at least one of the information about the candidate object, position information of the second sensor, and the motion information of the host ship; and
        obtaining the image of the candidate object using the controlled second sensor.

5. The method of claim 1, wherein in a case where a plurality of candidate objects are detected by the first sensor, the obtaining the image of the candidate object comprises
    obtaining an image of a candidate object located closer to the host ship with a higher priority among the plurality of candidate objects.

6. The method of claim 1, wherein
    the first sensor is a distance detection sensor, and
    the second sensor is an image capturing sensor.

7. The method of claim 1, wherein
    the first sensor is at least one of a Radar device or a Lidar device, and
    the second sensor is at least one of a camera or a PTZ camera.

8. The method of claim 1, wherein the determining whether the candidate object is a real object comprises:
    inputting the obtained image of the candidate object into an object detection model; and
    outputting a result of determining whether an object included in the obtained image is a real object by using the object detection model.

9. The method of claim 1, wherein the marker comprises at least one of a distance between the host ship and the real object, a bearing angle of the real object with respect to the host ship, a heading angle of the real object, a speed of the real object, a target ID of the real object, and a bounding box of the real object.

10. The method of claim 1, further comprising:
determining a direction angle and a speed of the host ship based on the information about the candidate object determined to be a real object; and
displaying an avoidance path determined based on the direction angle and the speed determined on the monitoring image.

11. The method of claim 10, further comprising:
controlling a steering gear of the host ship based on the determined direction angle; and
controlling a propulsion device of the host ship based on the determined speed.

12. A device for filtering a virtual object using a plurality of sensors, the device comprising:
a memory in which at least one program is stored; and
at least one processor configured to execute the at least one program,
wherein the at least one processor is configured to
obtain information about a candidate object using a distance detection sensor,
obtain an image of the candidate object using an image capturing sensor by controlling the image capturing sensor based on motion information of a host ship obtained by a motion sensor and location information and angle information of the image capturing sensor such that the candidate object is positioned at a center with a preset size in a frame of the image,
determine whether the candidate object is a real object using the image of the candidate object, and
display a marker containing information about the candidate object determined to be a real object on a monitoring image.

13. The device of claim 12, wherein the information about the candidate object comprises a bearing angle and a distance of the candidate object, and
the at least one processor is configured to
calculate coordinates of the candidate object using the bearing angle and the distance of the candidate object, and
generate a control value of the image capturing sensor based on the calculated coordinates and controls the image capturing sensor.

14. The device of claim 12, wherein the at least one processor is configured to
input the obtained image of the candidate object into an object detection model, and
determine whether an object included in the image of the obtained candidate object is a real object by using the object detection model.

15. The device of claim 12, wherein the marker comprises at least one of a distance between the host ship and the real object, a bearing angle of the real object with respect to the host ship, a heading angle of the real object, a speed of the real object, a target ID of the real object, and a bounding box of the real object.

* * * * *